United States Patent [19]

Ionescu

[11] Patent Number: 4,463,846
[45] Date of Patent: Aug. 7, 1984

[54] BOTTLE ORIENTING APPARATUS

[75] Inventor: Alexandru D. Ionescu, Fairfield, Conn.

[73] Assignee: New England Machinery, Inc., South Norwalk, Conn.

[21] Appl. No.: 32,111

[22] Filed: Apr. 23, 1979

[51] Int. Cl.³ .................................... B65G 47/24
[52] U.S. Cl. ............................. 198/399; 198/400
[58] Field of Search ............... 198/382, 389, 394, 399, 198/400, 396, 398, 415; 221/156

[56] References Cited

U.S. PATENT DOCUMENTS

| | | | |
|---|---|---|---|
| 2,764,274 | 9/1956 | Griswold et al. | 198/389 |
| 3,489,262 | 1/1970 | Roberts | 198/398 |
| 3,624,773 | 11/1971 | Krooss | 198/400 |
| 3,726,387 | 4/1973 | Krooss | 198/400 |
| 4,095,688 | 6/1978 | Ionescu | 198/399 |
| 4,148,390 | 4/1979 | Ionescu | 198/400 |

FOREIGN PATENT DOCUMENTS 2438181  2/1976  Fed. Rep. of Germany ...... 198/415

OTHER PUBLICATIONS

Western Electric Technical Digest #5, Jan. 1967, Orienting Apparatus, Hoenig et al., pp. 39 and 40.

Primary Examiner—Joseph E. Valenza
Attorney, Agent, or Firm—Jack Posin

[57] ABSTRACT

An apparatus for selectively orienting bottles by the apparatus in random first-end leading and first end trailing dispositions to substantially uniform first end leading dispositions. The apparatus includes transport means which engages each bottle at two surface portions which lie on a common lateral axis of such bottle and transport each bottle while it is so engaged at a predetermined speed. Booster means engage a third portion of each such bottle remote from such common lateral axis and urge the portion so engaged to move in the same direction at a higher predetermined speed. Thus, each bottle will tend to pivot about the common lateral axis of the portions engaged by the transport means. Stop means prevent the bottle which is initially in first end leading disposition from so pivoting but permit any bottle which is initially in second end leading disposition to pivot towards a first end leading disposition. The foregoing abstract should not be taken either as a complete exposition or as a limitation of the present invention.

15 Claims, 11 Drawing Figures

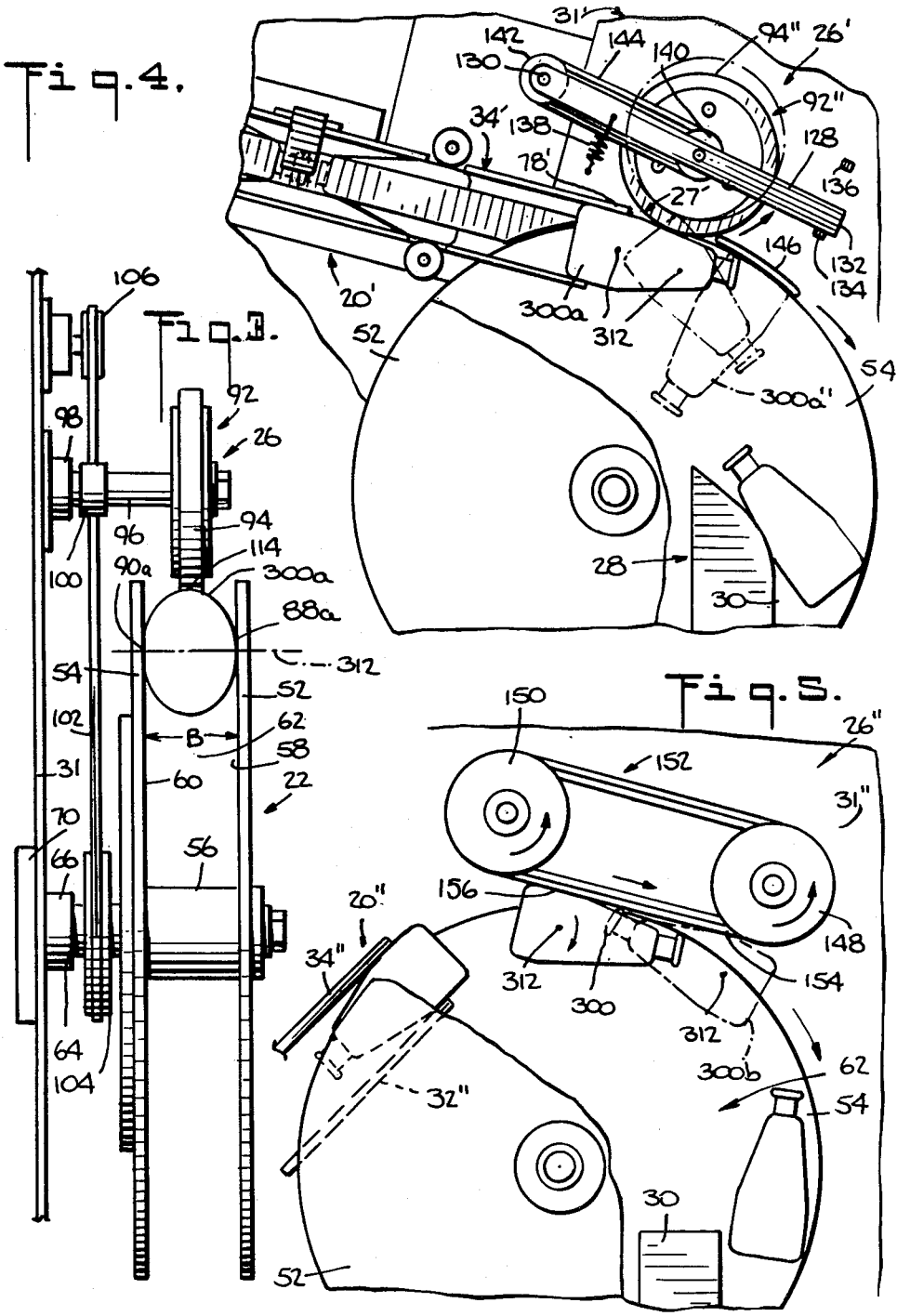

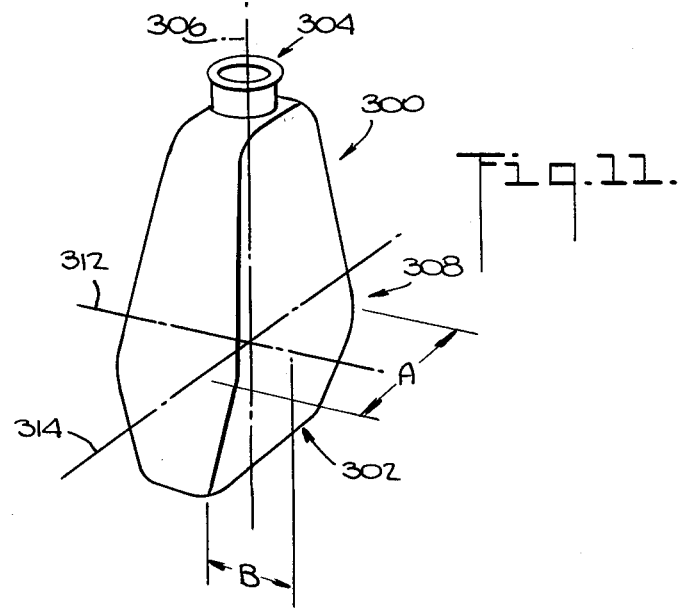
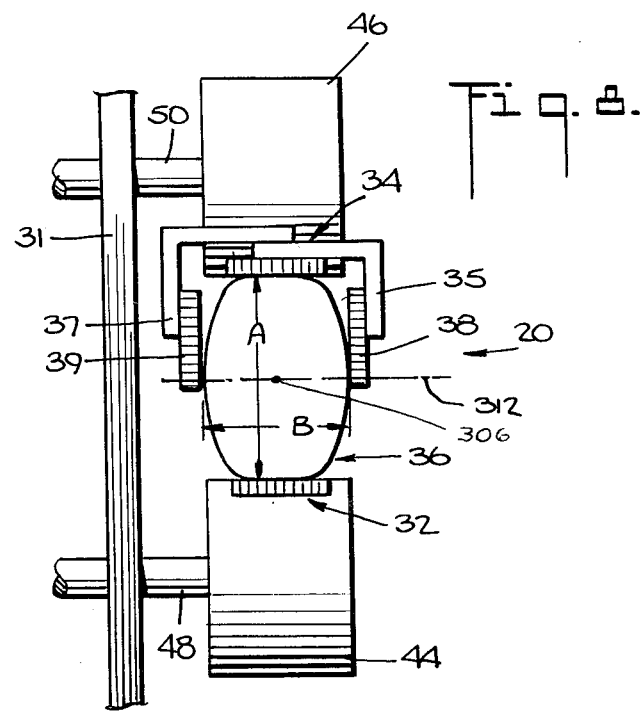

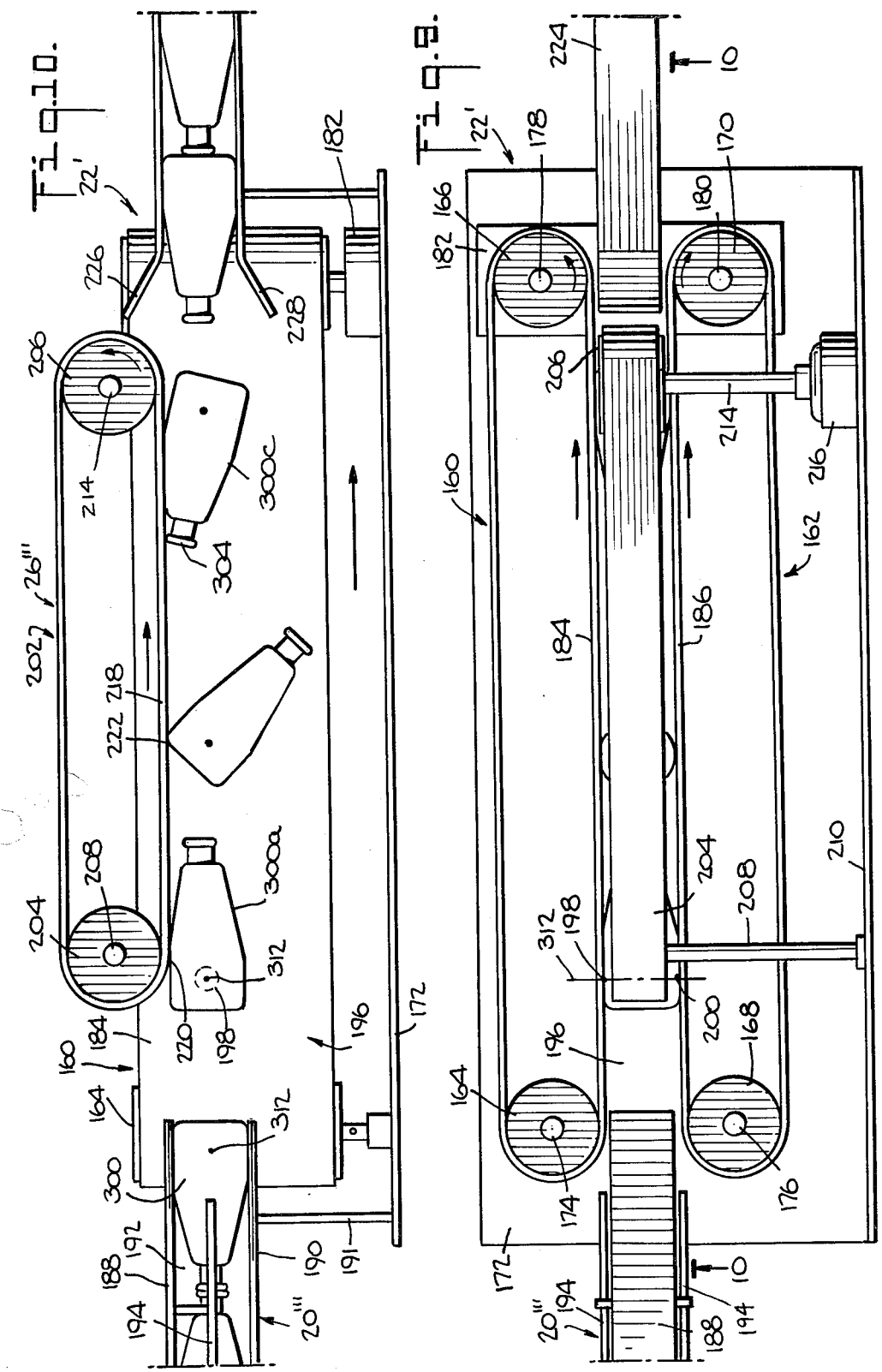

BOTTLE ORIENTING APPARATUS

BACKGROUND OF THE INVENTION

This invention relates to bottle orienting apparatus, and more particularly relates to apparatus for accepting bottles, each of which has a first end and a second end, in random, first end leading and first end trailing dispositions, and selectively reorienting the bottles so that they lie in substantially uniform, first end leading dispositions.

Pharmaceutical, food and cosmetic manufacturers among others utilize literally millions of bottles each year. As can be appreciated, these bottles must be processed on high speed treating and filling equipment, and they must be fed into such equipment in substantially uniform dispositions. For example, if bottles entering a filling machine were fed into such a machine in random dispositions, the filling nozzles would be aligned with the openings of some of the bottles, but would be misaligned with the openings of other ones of the bottles.

Normally, after the bottles have been formed, they are simply placed into boxes or bins in completely random disposition. Various types of apparatus are available for accepting a mass of such randomly oriented bottles and discharging them one by one in substantially endwise dispositions so that they constitute a stream of advancing bottles. However, such apparatus discharges some of the bottles with one end leading and discharges others of the bottles in the stream with the other end leading. Therefore, before such a stream of advancing bottles reaches the bottle treating and filling equipment, certain ones of the bottles must be reoriented so that all of the bottles lie in a substantially uniform disposition. Various devices have been proposed to accomplish such selective reorientation.

In describing apparatus of this type, it is useful to describe the elements of the apparatus with reference to the direction of motion of the bottles being processed. Thus, the term "downstream" should be understood as meaning "in the direction of motion of the bottles being processed", and the term "upstream" should be understood as meaning the reverse direction.

As can be appreciated, the cost of processing each bottle through any such apparatus will be inversely proportional to the speed of operation of the apparatus. As the speed of operation of the apparatus is increased, the cost of operating the apparatus for a given period of time is spread among a larger number of bottles, so that the cost of processing each bottle is reduced. Therefore, the development of bottle-orienting apparatus has been directed towards increasing the speed of operation of the apparatus.

U.S. Pat. No. 2,776,034, issued Jan. 1, 1957 to R. C. Jordt illustrates one type of device for selectively reorienting ampules having well defined, elongated neck portions. The ampules are fed through a chute by gravity, in random neck-leading and neck-trailing dispositions, towards a bend in the chute. At the bend, a hole is provided in one of the walls of the chute. If any ampules arrives in neck leading orientation at the bend in the chute, its neck will enter into the hole so that the motion of its neck end will be arrested. Its opposite end will continue to move along the chute and will therefore bypass the neck end. Thus, each such ampules is reoriented to a neck trailing disposition. By contrast, any ampules which arrives at the bend in the chute in neck trailing disposition will be unaffected by the hole, as the end of each ampules opposite from the neck is too wide to enter into the hole. Therefore, downstream of the bend in the chute, all of the ampules will be in substantially uniform, neck trailing orientation. However, the speed of operation of any such device will be limited by the speed at which the ampules will advance under the influence of gravity.

U.S. Pat. No. 4,095,688, issued June 20, 1978 to Christina S. Ionescu and assigned to the assignee of the present invention, teaches a different apparatus for accomplishing such a selective reorientation. This apparatus includes a pair of opposed, spaced rotating rollers which are so configured that they will not engage the relatively narrow neck ends of bottles being processed but will engage the relatively wide ends of such bottles which are opposite from the necks. The bottles are fed to the rollers in a direction transverse to the gap between the rollers. If a bottle is initially in neck-leading disposition, it will continue to move in the direction transverse to the gap until its neck end encounters a cam surface which tends to tilt the bottle so that its relatively wide, initially-trailing end lies between the rollers, whereupon that end will be engaged by the rollers and pulled through the gap. Thus, each such bottle will be discharged through the gap in neck-trailing disposition. By contrast, each bottle which is initially in neck-trailing disposition will retain such disposition as it passes through the rollers. Its relatively wide leading end will arrive at the rollers first and will be immediately engaged and pulled through the gap. Thus, the apparatus discharges the bottles in substantially uniform, neck-trailing dispositions.

U.S. Pat. No. 3,868,012, issued Feb. 25, 1975 to Louis H. Kinsley teaches an apparatus for orienting bottles having an open end and a closed end into uniform, closed end leading dispositions. In this apparatus, a stream of bottles in random open end leading and closed end leading dispositions is advanced down a chute. A pin is pivotally mounted to the chute so that it can be rotated between two different positions. In the first position the pin extends upstream along the chute from its pivot, while in the second position the pin extends downstream along the chute. While the pin is pointing upstream, a bottle is advanced until it enounters the pin. If the bottle has its open end leading, the pin will enter into the open end of the bottle and the bottle will thus become engaged with the pin. If on the other hand the bottle has its closed end leading, the pin cannot enter into the bottle and the bottle will not become engaged with the pin. After a bottle is advanced to the pin, the pin is pivoted to its second position wherein it points downstream. Thus, any bottle which was initially in an open end leading disposition will be pivoted along with the pin to a closed end leading disposition. Any bottle which was originally in a closed end leading disposition will not be rotated along with the pin and will therefore remain in a closed end leading disposition, so that the apparatus discharges a stream of bottles in substantially uniform, closed end leading dispositions.

As can be appreciated, the intermittent motion of the pin will limit the speed of operation of such apparatus. Further, because the pin must enter into at least some of the bottles being processed, the pin can contaminate or scratch the interiors of the bottles.

British Pat. No. 1,403,182, published Aug. 20, 1975, discloses other apparatus for selectively reorienting bottles. In this apparatus, a pair of rotationally mobile discs are coaxially mounted and define a space between them. The bottles are advanced into the space between the discs, become frictionally engaged with the discs and are transported downstream by the discs in random, open ending leading and open end trailing dispositions. A hook is pivotally mounted so that a bottle engaging portion of the hook extends into the space between the discs. The bottle engaging portion of the hook is biased in the upstream direction, and includes a pin which points upstream. If a bottle is transported by the discs in closed end leading disposition, the bottle engaging portion of the hook will simply be forced out of the way by the advancing bottle, and the disposition of that bottle will be substantially unaffected by the hook. By contrast, if a bottle is advanced by the discs in open end leading disposition, the pin of the hook will enter into the open end of the bottle and will retard the motion of the open end. Therefore, as the discs continue to rotate, the other portions of the bottle will bypass the open end so that the bottle is inverted to an open end trailing, closed end leading disposition.

Although such bottle orienting apparatus is capable of reliable operation at high speeds (on the order of hundreds of bottles per minute), it does present certain difficulties. For one, the speed of operation of the apparatus is limited by the speed at which the hook can move out of the way when a bottle arrives in closed end leading disposition and then return to its position between the discs to catch the next bottle. The speed with which the hook will move depends in part upon its polar moment of inertia about its pivotal mounting and in part upon the strength of bias applied to it. Of course, the polar moment of inertia about the pivot cannot be reduced indefinitely without weakening the hook. The strength of the bias on the hook cannot be increased indefinitely without making it impossible for the hook to swing out of the way in the event it encounters a closed end leading bottle. Futher, such apparatus tends to rather suddenly engage each open-end leading bottle with the hook and thereby subjects each such bottle to impact forces. Such impact forces are especially severe during extremely high speed operation of the apparatus.

BRIEF SUMMARY OF THE INVENTION

Accordingly, it is an object of the present invention to provide a bottle orienting apparatus which is capable of reliable operation at extremely high speeds.

It is a further object of the present invention to provide a bottle orienting apparatus which does not require engagement of the bottles being processed with any sort of pin, hook, or hole and which therefore avoids the problems associated with such engagement.

It is a yet another object of the present invention to provide a bottle orienting apparatus which is capable of processing bottles which do not have any well defined neck portion.

It is a further object of the present invention to provide a bottle orienting apparatus wherein no portion of the apparatus enters into the interior of any of the bottles being processed.

The bottle orienting apparatus of the present invention includes guide means for receiving a series of bottles, each bottle having a first end, a second end of different configuration than its first end, a lengthwise axis extending between its ends, and a bulbous section adjacent to its first end. The guide means sequentially advances such bottles in random first end leading and first end trailing dispositions. The apparatus also includes transport means for receiving each bottle advanced by the guide means and pivotably engaging two portions of the bulbous section of each such bottle. The portions of each bottle which are so engaged by the transport means lie on a common lateral axis of the bottle perpendicular to the lengthwise axis of the bottle and adjacent to the first end of the bottle. The transport means transports each such bottle, with the aforesaid portions so engaged, away from the guide means so that the portions of each such bottle which are engaged by the transport means move with substantially equal, predetermined velocities in a direction generally perpendicular to the aforesaid lateral axis of the bottle.

Booster means are provided for engaging a portion of each such bottle remote from the aforesaid lateral axis of that bottle during the transportation of that bottle by the transport means. The booster means urges the portion of each bottle so engaged by the booster means to move with a velocity of the same direction but of greater magnitude than the aforesaid predetermined velocities.

Thus, while a bottle is engaged by the transport means and by the booster means, the portions engaged by the transport means are moving with one velocity, while the portion engaged by the booster means tends to move with another, greater velocity. Therefore, each bottle which is so engaged will tend to pivot about the aforesaid lateral axis of the portions engaged by the transport means.

Stop means are provided for preventing any bottle which is in first end leading disposition at the inception of its engagement by the booster means from pivoting about the aforesaid lateral axis during its engagement by the booster means. However, the stop means do not prevent any bottle which is in first end trailing disposition at the inception of its engagement by the booster means from pivoting. Therefore, any bottle which is initially in first end trailing disposition will pivot towards a first end leading disposition during its transportation by the transport means and its engagement by the booster means, while any bottle which is initially in first end leading disposition will retain such disposition during its transportation by the transport means. Take-off means are provided for removing from the transport means each bottle transported by the transport means. Thus, the apparatus will discharge a series of bottles in substantially uniform, first end leading dispositions.

In one embodiment, the transport means includes a pair of disc-like elements which are mounted coaxially with one another so that opposed, radially extensive surfaces of the disc-like elements define a space between them. The transport means also includes means for rotating the disc-like elements about the common axis at the same speed and in the same direction. Thus, bottles are advanced by the guide means into the space between the disc-like elements, and a portion of each such bottle at the bulbous section thereof is frictionally engaged with each of the disc-like elements. The lateral axis of each bottle connecting the portions engaged with the disc like elements extends between the disc-like elements. The booster means includes a roller having a peripheral surface confronting the space between the disc-like elements, and means for rotating the roller so that the portion of the roller which frictionally engages each bottle moves with a greater speed but in the same direction as the portions of the disc-like elements engaging that bottle. Thus, each bottle tends to pivot about the aforesaid lateral axis of that bottle.

BRIEF DESCRIPTION OF THE DRAWINGS

FIG. 3 is a fragmentary sectional view taken along the plane indicated by line 3—3 in FIG. 1.

FIG. 4 is view similar to FIG. 2 but depicting an apparatus according to a second embodiment of the present invention.

FIG. 5 is a view similar to FIG. 2 but depicting an apparatus according to a third embodiment of the present invention.

FIG. 8 is a fragmentary sectional view taken along the plane indicated by line 8—8 in FIG. 1.

FIG. 9 is a schematic plan view of an apparatus according to a fourth embodiment of the present invention.

FIG. 10 is a sectional view taken along the plane indicated by line 10—10 in FIG. 9.

FIG. 11 is a perspective view of a bottle.

DETAILED DESCRIPTION OF THE PREFERRED EMBODIMENTS

Figure 1:
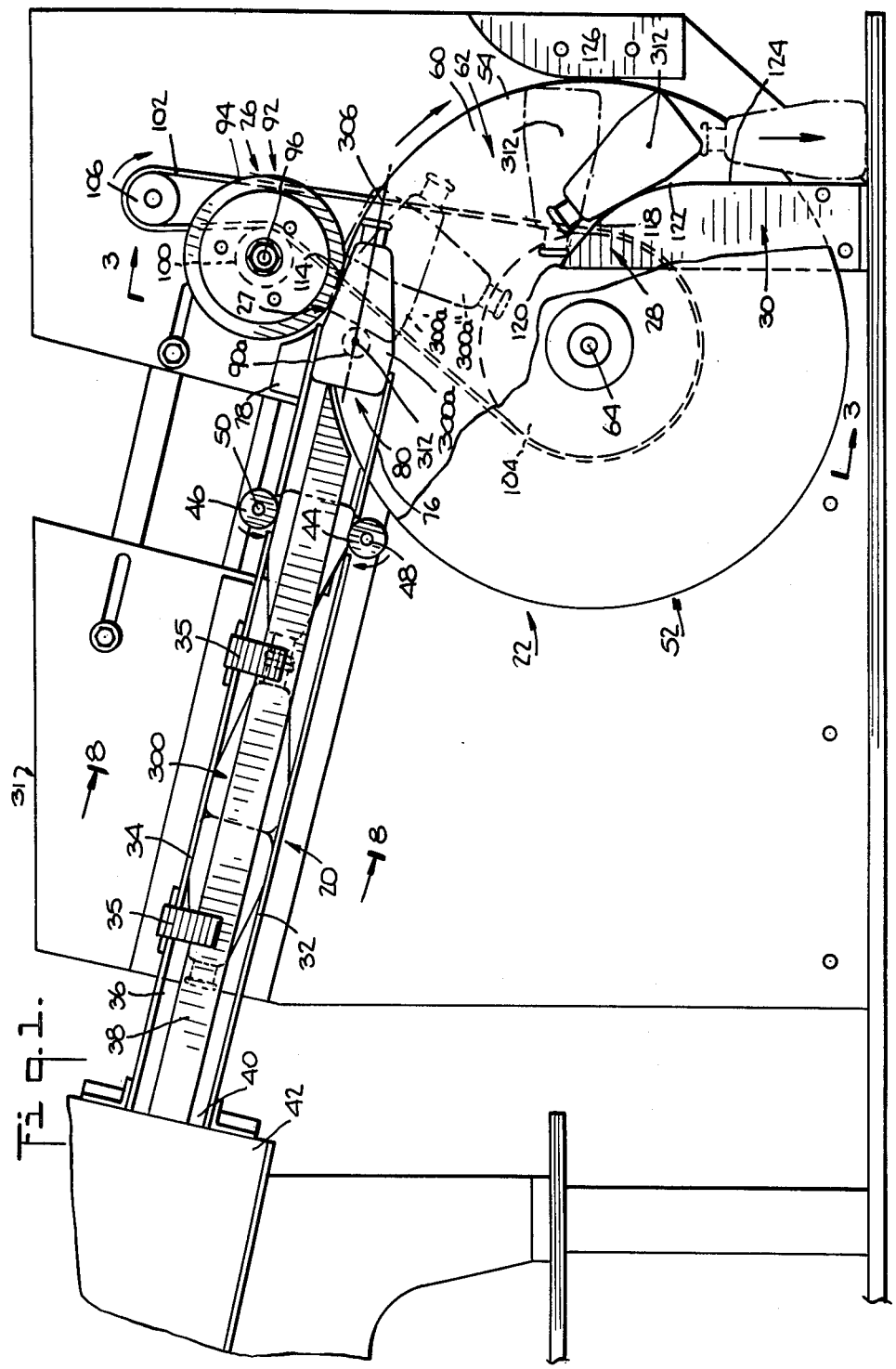
FIG. 1 is a fragmentary elevational view of an apparatus according to a first embodiment of the present invention, with a portion of one disc-like element removed for purposes of illustration.

The terms used in the remainder of this disclosure to describe the features and dimensions of bottles to be processed are illustrated in FIG. 11. The bottle 300 depicted in FIG. 11 has a first end 302, a second end 304 and a "lengthwise axis" 306 extending from the first end to the second end. Whenever a lateral axis is characterized herein as being "adjacent" to the first end of a bottle; such characterization should be understood to mean that the lateral axis referred to is closer to the first end of the bottle than it is to the second end of that bottle. For example, the lateral axes 312 and 314 are both "adjacent" to the first end 302 of the bottle 300.

The term "lateral axis" should be understood to mean an axis of the bottle which extends perpendicularly to the lengthwise axis of the bottle at a point where the dimension of the bottle in the direction of such axis is at a maximum. For example, the axes 312 and 314 are both lateral axes of the bottle 300; dimension "B" is at a maximum at axis 312, and dimension "A" is at a maximum at axis 314. The "length" of any lateral axis of a bottle should be understood to mean the exterior dimension of the bottle measured along such lateral axis.

Figure 2:
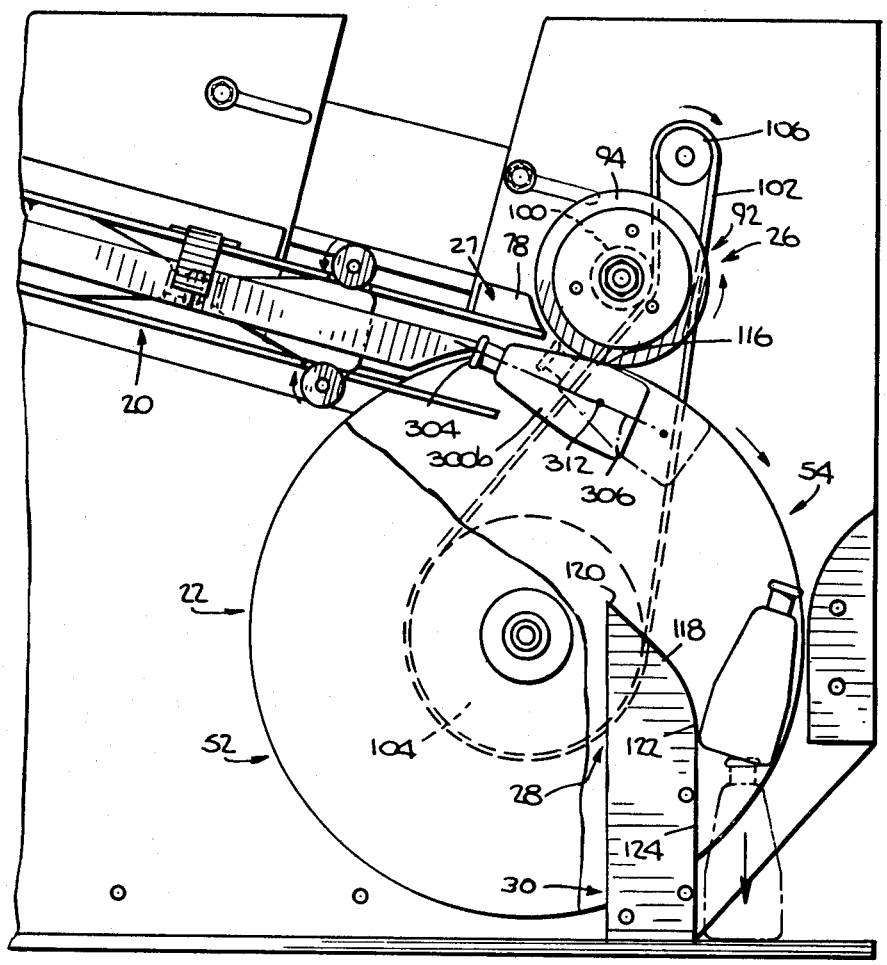
FIG. 2 is a fragmentary, elevational view of the apparatus depicted in FIG. 1, with a portion of one disc-like element removed for purposes of illustration.

An apparatus according to a first embodiment of the present invention is shown in FIGS. 1, 2, 3 and 8. It includes guide means 20 (FIG. 1) and transport means 22. In operation, as will be described in greater detail below, the guide means 20 sequentially advances the bottles 300 which are being processed to the transport means 22, and the transport means transports each such bottle away from the guide means, generally in a clockwise direction as shown in FIGS. 1 and 2. As the bottles are being transported by the transport means 22, they are engaged by the booster means 26, which tends to pivot each bottle about its lateral axis 312 in a clockwise direction as shown in FIG. 1. Any bottle which is initially in a second end leading orientation, such as the bottle 300a depicted in FIG. 1, will pivot in this manner towards a first end leading orientation. Such bottles are then carried downstream by the transport means to a stationary member 28, which causes them to further pivot towards a first end leading disposition. By contrast, any bottle which is initially in first end leading disposition, such as the bottle 300b depicted in FIG. 2 is prevented from pivoting during its engagement with the booster means 26 by the stop means shown generally at 27 and, as shown in FIGS. 1 and 2, constituted by adjacent portions of the guide means 20 and the booster means 26. Thus, such bottles remain in first end leading disposition during their transportation by the transport means. As will be appreciated, this selective pivoting action results in the stream of bottles reaching takeoff means 30 in substantially uniform, first end leading disposition. The takeoff means removes from the transport means each bottle transported by the transport means. Thus, the apparatus emits a stream of substantially uniformly oriented bottles, which can then be further processed on conventional bottle handling and filling equipment.

As shown in FIGS. 1 and 8, the apparatus includes a generally planar frame 31. The guide means 20 includes a pair of opposed, elongated guide members 32 and 34 which are affixed to the frame. These guide members define an elongated channel 36 between them. Supported from upper guide member 34 by brackets 35 and 37 are side guide members 38 and 39 (FIG. 8) which extend towards the lower guide member 32 to further enclose the channel 36. The various guide members are arranged so that the greatest lateral dimension of the channel 36 is less than the length of each bottle to be processed. Thus, any bottle advancing along the channel will have its lengthwise axis 306 generally parallel to the direction of elongation of the channel 36. The guide members are arranged to constrain the bottles in the channel 36 so that the shortest lateral axis 312 of each bottle extends generally perpendicularly to the plane of the frame 31.

The upstream end 40 (FIG. 1) of the channel 36 communicates with the outlet of a supply unit 42 which is arranged to contain a large number of bottles in a hopper and discharge these bottles in succession into the channel 36 in random, first end leading and first end trailing dispositions. Any of the known known types of such supply units can be utilized. One supply unit which is appropriate for high speed operation includes a hopper and a rotating cone (not shown) which serve to discharge the bottles into the channel 36 under slight pressure. Such a supply unit is sold under the registered trademark CENTRIFEED by the firm Tangen Drives, Inc. of Clearwater, Fla.

A pair of opposed resilient timing rollers 44 and 46 are mounted on respective shafts 48 and 50 which in turn are rotatably mounted to the frame 31 so that the timing rollers protrude slightly into the channel 36 through appropriate openings in the guide members 32 and 34. The shafts 48 and 50 are driven by a timing roller drive means (not shown) so that they rotate in opposite directions at a predetermined speed, and the peripherial portion of each roller which extends into the channel moves in the downstream direction. Thus, as seen in FIG. 1, the bottom timing roller 44 rotates clockwise while the top timing roller 46 rotates counterclockwise. Because these rollers extend into the channel 36, they frictionally engage each bottle 300 as it moves downstream through the channel 36 and cause each such bottle to move downstream through the channel at a predetermined rate.

As shown in FIGS. 1, 2 and 3, the transport means 22 includes a pair of mobile transport elements in the form of disc-like elements 52 and 54. These disc-like elements are mounted coaxially with one another on a hub 56 so that their respective opposed radially extensive surfaces 58 and 60 are parallel with one another and define a space 62 between them. The disc-like elements are constructed so that at last their respective confronting surfaces 58 and 60 are resilient. In the apparatus shown in FIGS. 1, 2, 3 and 8, each disc-like element is fabricated entirely from a resilient material. Alternatively, each disc-like element can include a layer of a rigid material such as steel or aluminum and a layer of a resilient material such as foam rubber, with the layer of resilient material being positioned at the confronting surface of each disc-like element.

The assembly comprising the disc-like elements 52 and 54 and the hub 56 is fixedly mounted to a shaft 64, which in turn is rotatably mounted to the frame 31 by means of a bearing 66. Thus, the disc-like elements are mounted so that the confronting surfaces 58 and 60 of the disc-like elements lie in planes parallel to the plane of the frame 31. The shaft 64 is driven by a drive motor 70; the direction of rotation of the motor 70 is chosen so that shaft 64 rotates clockwise as seen in FIG. 1.

The downstream end 76 of the lower guide member 32 extends into the space between the disc-like elements. The downstream end 78 of the upper guide member 34, which is further from the axis of the disc-like elements, extends immediately radially outwardly of the space between the disc-like elements. Therefore, they will guide each bottle which advances downstream through the channel 36 into the space 62 between the disc-like elements so that the lengthwise axis of each such bottle extends generally parallel to the confronting surfaces of the disc-like elements and generally chordally of the disc-like elements.

As described above, the guide members constrain each bottle so that its shortest lateral axis 312 extends generally perpendicularly to the plane of the frame 31. As shown in FIG. 3, the surfaces 58 and 60 of the disc-like elements lie in planes parallel to the plane of the frame 31. Thus, the shortest lateral axis 312 of each bottle which is advanced by the guide means into the space 62 between the disc-like elements will extend generally perpendicularly to the surfaces 58 and 60. Because the width of the space 62 between the surfaces 58 and 60 of the disc-like elements is slightly less than the length of lateral axis 312, the bottle will be grasped between the disc-like elements. Surface portion 88a of bottle 300a is frictionally engaged with the surface 58 of disc-like element 52, and surface portion 90a is frictionally engaged with the surface 60 of disc-like element 54. Both of these surface portions 88a and 90a of bottle 300a lie on the lateral axis 312 of the bottle 300a.

Each bottle which is so engaged will be transported by the disc-like elements as they rotate, and will therefore be transported away from the guide means 20. Preferably, the peripheral speed of the disc-like elements is greater than the speed at which the bottles advance along the channel 36 (FIG. 1) under the influence of the timing rollers 44 and 46. Thus, as each bottle becomes engaged with the disc-like elements, its speed will increase and it will accelerate away from the next succeeding bottle which is being advanced along the channel. This accelerating action assures that the bottles are spaced apart from one another while they are being transported by the disc-like elements, and prevents the bottles from interfering with one another as they are reoriented during such transportation.

As shown in FIG. 1, the surface portion 90a of bottle 300a which is engaged with the surface 60 of disc-like element 54 is of relatively limited extent. Likewise, the surface portion 88a (FIG. 3) which is engaged with the opposing surface 58 of disc-like element 52 is also of a relatively limited extent. Because both of these engaged surface portions lie on a common lateral axis 312, the bottle 300a can be pivoted about this lateral axis during its transportation by the disc-like elements 52 and 54.

As shown in FIGS. 1, 2 and 3, the booster means includes a roller 92 which has a resilient peripheral surface 94. The roller 92 is fixedly mounted to a shaft 96 which in turn is rotatably mounted to the frame 31 by means of a bearing 98. The frame, bearing and shaft associated with the roller 92 are constructed and arranged to support the roller 92 so that its axis extends parallel to the axis of rotation of the disc-like elements 52 and 54; the shaft 96 on which roller 92 is mounted extends parallel to the shaft 64 on which the disc-like elements 52 and 54 are mounted. The shaft 96 is at a fixed distance from the shaft 64. As shown in FIGS. 1 and 3, the portion of the roller surface 94 which is at the bottom of the roller at any given time confronts the space 62 between the disc-like elements. The shaft 96 is linked to the drive motor 70 by means of a pulley 100 fixedly mounted to the shaft 96, an endless belt 102 operatively associated with the pulley 100, a drive pulley 104 fixedly mounted to shaft 64, and an idler pulley 106 rotatably mounted to the frame 31.

As will be apparent from inspection of FIGS. 1 and 3, the arrangement of the components which connect the drive motor 70 with the roller 92 and the disc-like elements 52 and 54 will cause the roller and the disc-like elements to rotate in opposite directions and at different speeds. The roller will rotate in a counterclockwise direction, as seen FIG. 1, and the disc-like elements will rotate in a clockwise direction at a slower rotational speed.

With the clockwise rotation of the disc-like elements 52 and 54, the portions of the disc-like elements which engage each bottle will move generally to the right in the vicinity of the roller 92. The bottom portion of the peripheral surface 94 of roller 92, which confronts the space between the rollers, also moves generally to the right with the counterclockwise rotation of the roller 92. Thus, this confronting peripheral surface portion of the roller 92 moves in the same direction as the bottle engaging portions of the disc-like elements 52 and 54. However, because the roller 92 rotates at a higher rotational speed than the disc-like elements 52 and 54, the confronting peripheral surface portion of the roller 92 moves at a higher linear speed than the bottle-engaging portions of the disc-like elements.

Because the roller 92 extends slightly into the path of bottles transported by the disc-like elements, the surface of the roller will frictionally engage a surface portion of each bottle, remote from the common lateral axis of that bottle on which the portions engaged by the disc-like elements lie. For example, as shown in FIGS. 1 and 3, the surface portion 114 of bottle 300a which is engaged by the roller 92 is remote from the lateral axis 312 of that bottle. The roller will urge the portion 114 of the bottle to move to the right, as shown in FIG. 1, with a higher speed than the portions of the bottle on lateral axis 312 which are engaged with the disc-like elements. Thus, the bottle 300a will tend to pivot about its lateral axis 312.

As soon as the bottle 300a clears the downstream end 78 of the upper guide member 34, the bottle 300a will begin to pivot in a clockwise direction as seen in FIG. 1, about its lateral axis 312. Thus, while the bottle is in the vicinity of the roller 92, it is transported by the disc-like elements and pivoted about its lateral axis by the action of the roller. As this action occurs, the portions of the bottle which were previously engaged with the peripheral surface of the roller become disengaged from the surface and new portions of the bottle become engaged with the peripheral surface of the roller. Thus, the bottle will continue to pivot about its lateral axis under the impetus of the roller for so long as it remains in the vicinity of the roller. Starting from the first end trailing disposition depicted in solid lines in FIG. 1, the bottle pivots into the disposition illustrated in broken lines at 300a' in FIG. 1 and then into the intermediate disposition illustrated in broken lines at 300a" in FIG. 1 under the impetus of the roller. By the time the bottle reaches the intermediate disposition 300a", the rotation of the disc-like elements 52 and 54 have carried it downstream of the roller 92.

As can be appreciated, the pivoting motion described above may entail a slight radially outward motion of the first end of the bottle. The amount of such motion will depend on the distance between the lateral axis of the bottle about which the bottle pivots and its first or initially trailing end. If the lateral axis is spaced somewhat from the first end of the bottle, the first end of the bottle will swing radially outwardly with respect to the disc-like elements as the bottle pivots. If the corners of the bottle at its first end are substantially rounded, this action will not cause any interference between the first end of the bottle and the roller 92. However, if these corners are fairly sharp, as with the bottles 300 depicted in FIG. 1, the corner of each bottle at its first end which lies radially outward with respect to the disc-like elements may tend to interfere with the roller 92. However, the resilient peripheral surface 94 of the roller 92 allows such corner of each bottle to dig into the roller to a limited degree and thus allows the pivoting motion described above to occur despite such interference.

Any bottle, such as the bottle 300b depicted in FIG. 2, which is advanced by the guide means 20 in first end leading disposition will retain such disposition despite the action of the booster means 26. Each such bottle will be grasped between the disc like elements 52 and 54 at its lateral axis 312, and transported downstream with the rotation of the disc-like elements. However, because the lateral axis of each such bottle is closer to the first end of the bottle than it is to the second end of that bottle, the second end 304 of any such bottle will extend substantially upstream of the lateral axis 312.

The peripheral surface of the roller 92 will engage a portion 116 of each such bottle remote from the lateral axis 312. Thus, each such bottle will tend to pivot in the clockwise direction about its lateral axis 312. However, the downstream end 78 of the upper guide member 34 lies immediately upstream of the roller 92 at a fixed distance from the axis of rotation of the disc like elements 52 and 54. As the bottle 300b attempts to pivot about its lateral axis 312 under the impetus of the roller 92, its trailing second end tends to swing radially outwardly with respect to the disc like elements 52 and 54. The downstream end 78 of the upper guide member 34 interferes with such radially outward motion of the second end 304 and thus prevents any substantial clockwise pivoting of the bottle 300b at least until its second end 304 clears the downstream end 78. Thus, the downstream end 78 of the upper guide member will serve as a stop member and function as part of the stop means 27 to help prevent any such bottle from pivoting.

If, as depicted in FIG. 2, the shape of the bottles being processed is such that the roller 92 remains in contact with each bottle even after the second end of the bottle has cleared the downstream portion or stop member 78, the roller itself will prevent any substantial outward movement of the trailing upstream end. Although the surface 94 of roller 92 is somewhat resilient, this resilience will not be sufficient to allow the substantial radially outward movement of the trailing second end 304 which would accompany any substantial pivoting of such a bottle about its lateral axis 312. Thus, the roller also acts as part of the stop means 27 for preventing pivoting, during its engagement with the roller or booster means, of any bottle which is advanced by the guide means 20 in first end leading orientation. Any such bottle will be transported downstream of the roller 92 by the disc-like elements 52 and 54 in first end leading disposition, as shown in FIG. 2.

By contrast, any bottle which is advanced by the guide means 20 in second end leading orientation will be pivoted, during its engagement with the roller 92 to the intermediate disposition depicted at 300a" in FIG. 1. Thus, downstream of the roller 92, the disc-like elements transport some bottles in first end leading disposition, and some in the intermediate disposition. The stationary member 28 cooperates with the disc-like elements 52 and 54 to further pivot any bottle which is in the intermediate disposition to a first end leading disposition. The stationary member 28 is formed integrally with the take-off cam 30. The take-off cam 30 is affixed to the frame 31 so that the stationary member 28 extends between the disc-like elements 52 and 54 downstream of the roller 92. The stationary member 28 has a cam surface 118 which faces generally radially outwardly with respect to the disc-like elements 52 and 54. The cam surface 118 slopes radially outwardly in the downstream direction; its upstream end 120 is radially inward of its downstream end 122.

The cam surface 118 lies radially inwardly of the path swept by the bottle engaging portions of the disc-like elements 52 and 54. Thus, the lateral axis 312 of each bottle will pass radially outwardly of the cam surface 118 as that bottle is transported past the stationary member 28. As shown in FIG. 1, the second end of any bottle which is in the intermediate disposition will encounter the cam surface 118. The cam surface will retard the downstream motion of the second end of each such bottle and force it radially outwardly as the disc-like elements continue to move the lateral axis of that bottle downstream. Thus, any such bottle will pivot in a clockwise direction as shown in FIG. 1 about its lateral axis 312 during its engagement with the cam surface 118.

Therefore, by the time the bottles clear the downstream end 122 of the cam surface 118, they are in substantially uniform, first end leading dispositions. With continued rotation of the disc-like elements, each bottle encounters the stationary takeoff cam 30. The stationary takeoff cam 30 has a bottle engaging surface 124 which extends from the downstream end 122 of the cam surface 118 to a point outside of the periphery of the disc-like elements. As each bottle encounters the bottle engaging surface 124, the rotation of the disc-like elements forces it to slide along the surface 124, in a generally downward direction as shown in FIG. 1, until its lateral axis 312 passes beyond the periphery of the disc-like elements. As the lateral axis 312 of each bottle passes beyond the periphery of the disc-like elements, the bottle is disengaged from the disc-like elements and continues to move away from the disc-like elements, generally downwardly as shown in FIG. 1, under the momentum imparted by the disc-like elements during engagement of the bottle with the disc-like elements.

A cam 126 is fixedly mounted to the frame 31 radially outwardly of the disc-like elements 52 and 54. The cam 126 overlies the space between the disc-like elements and extends from a point slightly upstream of the stationary member 28 to a point opposite the upstream end of the take-off cam 30. This cam will help to properly reposition any bottle which may have accidently become radially outwardly displaced with respect to the disc-like elements.

Thus, the apparatus described above will discharge a stream of bottles in substantially uniform, first end leading dispositions at the take-off cam 124. Bottles which are so discharged may be received by any conventional bottle handling equipment for further processing. For example, bottles which are discharged may be directed towards an apparatus such as the one shown in U.S. Pat. No. 4,148,390, which issued Apr. 10, 1979 to Alexandru D. Ionescu and is assinged to the assignee of the present invention. Such an apparatus includes a linearly mobile horizontal belt and a pair of opposed, inclined endless belts. If this arrangement is utilized, the upstream ends of the endless belts are positioned in the path of the downwardly-moving bottles discharged from between the disc-like elements. As the leading first end of each such bottle encounters the moving horizontal belt, the belt imparts a component of velocity in the downstream direction of the belt to the bottle. Thus, as each such bottle rebounds upwardly from the horizontal belt, it will also move in the downstream direction of that belt. Each such rebounding bottle will be grasped between confronting runs of the opposed, inclined, endless belts, and will be transported downstream by such endless belts. Because the inclined endless belts slope toward the horizontal belt in the downstream direction, each bottle transported thereby will be forced back down onto the horizontal endless belt in first-end down disposition. Thus, despite the rebounding which normally occurs when bottles are discharged onto a belt conveyor at high speeds, this apparatus will place each bottle discharged from between the disc-like elements onto the belt conveyor in stable, first-end down disposition.

As described above, bottles which are initially in a first end trailing disposition will be pivoted only part of the way towards a first end leading disposition by the action of the roller 92, and are pivoted the remainder of the way by the stationary member 28. The degree to which bottles are pivoted by the action of the roller will be dependent upon the relative speeds of the periphery of the roller and of the bottle engaging portions of the disc-like elements, and by the size and configuration of the bottles being processed. As the difference in speed between the peripheral portions of the roller and the bottle engaging portions of the disc-like elements increases, the degree of pivoting which occurs during engagement of each bottle by the roller will also increase. As the duration of the engagement of each bottle with the roller increases, the degree of pivoting during engagement of each bottle with the roller will also increase. It is possible to pivot any bottle which is in first end trailing disposition completely into a first end leading disposition solely by action of the roller as described above. However, in the embodiment depicted in FIGS. 1 through 3 and 8, the roller drive apparatus and disc-like element drive apparatus are arranged so that the peripheral speed of the roller is approximately one and one-half to two times the speed of the bottle engaging portions of the disc-like elements. In this embodiment, bottles are only pivoted by the roller as far as the intermediate disposition 300a".

In the foregoing description, certain elements of the apparatus have been described as being fixed to one another or mounted at fixed locations with respect to other elements of the apparatus. It should be clearly understood that as used in this disclosure, the terms "fixed" and "affixed" should be understood as meaning fixed or affixed in such a manner as to remain in a constant spatial relationship during operation of the device. When a single piece of apparatus is to be utilized, during different periods of operation, with bottles of differing sizes and shapes, the relationships of the "fixed" or "affixed" components will often have to be adjusted to compensate for such differences in the size and shape of the bottles to be processed. Therefore, if the apparatus is intended to be so utilized, the various components of the apparatus which are fixed or affixed to one another should be fixed or affixed in such a manner that, although they will remain in fixed spatial relationship during operation of the apparatus, their spatial relationships may be adjusted relative to one another between periods of operation of the apparatus to accomodate the various sizes and shapes of bottles. In particular, the guide members 32, 34, 38 and 39 of the guide means 20 (FIG. 8) should be adjustable relative to one another to allow various sizes and shapes of bottles to be processed. The positions of the guide members 32 and 34, and of the stationary member 28 (FIG. 1) should also be adjustable relative to the disc-like elements 52 and 54. The timing rollers 44 and 46 should be adjustable relative to one another and relative to the guide members. The mobile, disc-like elements 52 and 54 should be adjustable towards or away from one another so as to vary the width of the space 62 between them to accomodate bottles of differing sizes and configurations. Also, the mobile element or roller 92 of the booster means 26 should be adjustable with respect to the disc-like elements.

Of course, various means for mounting the elements of a machine so that they will remain in fixed spatial relationships during operation of the machine but so that their positions may be adjusted between such periods of operation are well known to those skilled in the mechanical arts. For example, the non-mobile components of the apparatus (such as the guide members and the stationary member) may simply be mounted to the frame 31 of the machine by means of bolts extending through slots in these components and nuts which threadedly engage the bolts. So long as the bolts are tight, the components affixed to the frame by the bolts will remain in a fixed location with respect to the frame. If the bolts are loosened, as they may be while the machine is not operating, the positions of the components can be adjusted. The bearings supporting the rotationally mobile elements may be mounted to the frame by means of a similar arrangement of bolts and slots.

It is desirable to mount the various components of the apparatus so that certain of such components can be removed and replaced with other, similar components of different sizes and shapes to accommodate different bottles. For example, to provide for adjustment of the disc-like elements 52 and 54 (FIG. 3) towards or away from one another, it is desirable to mount the disc-like elements so that they may be removed from the hub 56 and replaced with different disc-like elements. It is also desirable to mount the hub 56 to the shaft 64 so that it may be removed and replaced by a hub of different axial extent. Further, the roller 92 should be mounted to the shaft 96 so that it may be removed and replaced with a different roller.

As described above, the guide members of apparatus depicted in FIGS. 1, 2, 3 and 8 were arranged to feed each bottle to the transport means so that the shortest lateral axis 312 of each such bottle extended generally perpendicularly between the surfaces of the disc-like elements. In certain cases, it may be desirable to readjust the guide members so that they advance each bottle to the transport means with the longest lateral axis of each bottle extending generally perpendicularly to the disc-like elements.

Figure 6:
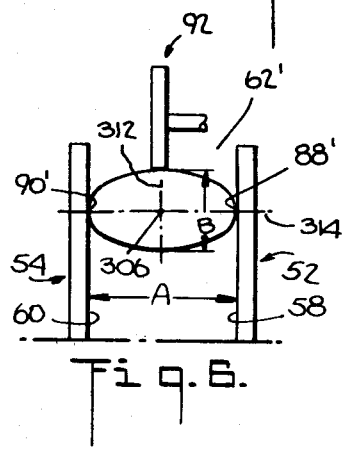
FIGS. 6 and 7 are schematic, fragmentary views depicting variations of portions of the apparatus shown in FIGS. 1, 2 and 3.

If the guide members are so adjusted, the disc-like elements 52 and 54 should be adjusted as shown in FIG. 6. In such an arrangement, the width of the space 62' between the disc-like elements is slightly less than the length A of the longest lateral axis 314 of each bottle, but is greater than the length B of the shortest lateral axis 312 of each bottle. Thus, the surfaces 58 and 60 of the disc-like elements will engage respective portions 88' and 90' of each bottle which lie on the longest lateral axis 314 of that bottle. As can be appreciated, in such an arrangement each bottle will tend to pivot about its longest lateral axis 314, rather than about its shortest lateral axis 312. This arrangement is normally less desirable than the arrangement described above, because a bottle may become accidently dislodged from its engagement with the disc-like elements by rotating about its lengthwise axis 306 (seen in end view in FIG. 6). If the arrangement depicted in FIG. 6 is utilized, the components of the apparatus must be carefully adjusted to avoid applying any substantial moment to each bottle about its lengthwise axis 306 during its engagement with the disc-like elements.

Figure 7:
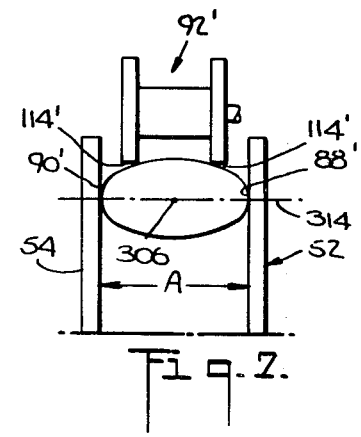

In the arrangements described above, the roller of the booster means was arranged to engage each bottle at only one portion. As shown in FIG. 7, the roller 92' of the booster means may be so configured as to engage each bottle at two portions 114'. Such portions must, of course, be remote from the lateral axis 314 about which the bottle is to pivot. If this arrangement is utilized, the roller 92' will help to prevent each bottle from rotating about its lengthwise axis 306 (seen in end view in FIG. 7), and will help prevent dislodgement of the bottles from between the disc-like elements.

Apparatus according to a second embodiment of the present invention is partially depicted in FIG. 4. This apparatus is similar to that described above. However, the roller 92" of the apparatus depicted in FIG. 4 is rotatably mounted to an arm 128, which in turn is pivotably mounted to the frame 31' of the apparatus by a shaft 130. The free end 132 of the arm is positioned between a pair of stops 134 and 136. As can be appreciated, the arm 128 may pivot about shaft 130 over a limited extent, so that the roller 92" may move, over a limited extent, towards or away from the axis of rotation of the disc-like elements 52 and 54. However, the roller 92" will always rotate in a plane parallel to the planes of rotation of the disc-like elements, and the axis of rotation of the roller 92" will always lie outside of the periphery of the disc-like elements. The arm 128 and the roller 92" are biased towards the axis of the disc-like elements by a tension spring 138 which is connected between the frame 31' and the arm 128.

A pulley 140 is fixedly mounted to the roller 92" so that the pulley 140 lies coaxially with the roller. A drive pulley 142 is rotatably mounted to the frame 31' coaxially with the shaft 130. The drive pulley 142 and the driven pulley 140 are connected by an endless belt 144 which extends around those pulleys. The drive pulley 142 in turn is connected to drive means (not shown). As in the embodiment described above, the drive means associated with the disc-like elements 52 and 54 are arranged to rotate these elements in a clockwise direction as seen in FIG. 4. The drive means associated with the roller 92" are arranged to rotate it in the counterclockwise direction, as seen in FIG. 4, at a rotational speed higher than the rotational speed of the disc-like elements 52 and 54. Even though the roller 92" is smaller in diameter than the disc-like elements 52 and 54, its peripheral surface 94" moves at a higher speed than the bottle engaging portions of the disc-like elements 52 and 54.

As in the first embodiment described above, the peripheral surface 94" of the roller 92" confronts the space between the disc-like elements 52 and 54. When the arm and roller are in the position illustrated in solid lines in FIG. 4, the peripheral surface 94" of the roller will engage a portion of each bottle transported by the disc-like elements 52 and 54 and will therefore urge each bottle so engaged to pivot about its lateral axis 312 in a manner similar to that described above. If the shape of the bottles being processed is such that pivoting motion entails some radially outward movement of the first end of the bottle, the roller 92" can move radially outwardly with respect to the disc like elements to accomodate this motion, as illustrated in broken lines in FIG. 4. Therefore, the peripheral surface 94" of the roller 92" need not be resilient to accommodate such motion.

The downstream end 78' of the upper guide member 34' extends to a point immediately upstream of the roller 92". Thus, because this downstream end is mounted at a fixed location with respect to the axis of rotation of the disc-like elements 52 and 54, it acts as an upstream stop member and, as part of the stop means 27', prevents any radially outward movement of the trailing second end of any bottle which is initially in first-end leading disposition. The stop means 27' also includes a downstream stop member 146 which is fixedly mounted to the frame 31' immediately downstream of the roller 92". The downstream stop member 146 also acts to prevent the trailing second end of any bottle which is initially in first-end leading disposition from moving radially outwardly with respect to the disc-like elements during its engagement by the roller 92". By the time the trailing second end of any first-end leading bottle clears the upstream stop member 78', its lateral axis 312 is alongside of the downstream stop member 146. Thus, the upstream end of the downstream stop member 146 will prevent the trailing second end of any such bottle from moving radially outwardly. Therefore, any such bottle will be restrained from pivoting about its lateral axis 312 during its entire engagement with the roller 92".

Any bottle which, like the bottle 300a depicted in FIG. 4, is initially in first end trailing orientation will be rotated to the intermediate disposition 300a'' before that bottle reaches the downstream stop member 146. Any bottle which is initially in first end leading disposition will retain such disposition, and will be prevented from pivoting by the stop members 78' and 146. Therefore, bottles transported downstream of the downstream stop member 146 will be either in the intermediate disposition as depicted at 300a'' or in first end leading disposition. As in the apparatus described above, the stationary member 28 will cooperate with the disc-like elements 52 and 54 to pivot any bottle which is in the intermediate disposition to a first end leading disposition, and the takeoff cam 30 will cause bottles transported by the disc-like elements 52 and 54 to be ejected therefrom, resulting in a stream of bottles ejected in substantially uniform, first end leading disposition.

An apparatus according to a third embodiment of the present invention is partially depicted in FIG. 5. The booster means 26'' of this apparatus do not include a roller as described above. In place of the roller, the booster means of this apparatus incorporate a pair of pulleys 148 and 150 which are operatively associated with an endless belt 152 and support the endless belt so that its first run 154 confronts the space between the disc-like elements 52 and 54. The pulleys 150 and 148 are rotatably mounted to the frame 31'' of the apparatus. Appropriate drive means (not shown) are associated with the pulley 148 to rotate it in a counterclockwise direction, as seen in FIG. 5. The rotation of the pulley 148 causes run 154 of the belt to move to the right as seen in FIG. 5. The drive means associated with the disc-like elements 52 and 54 are arranged to rotate them in a clockwise direction as seen in FIG. 5. Thus, the surface of the run 154 which confronts the space between the disc-like elements moves in the same direction (to the right in FIG. 5) as the bottle engaging portions of the disc-like elements. However, the drive means associated with the pulley 148 are arranged so that the run 154 moves at a higher linear speed than the bottle engaging portions of the disc-like elements.

The run 154 is positioned so that it will engage a portion 156 of each bottle transported by the disc-like elements. The portion so engaged is remote from the common lateral axis 312 of each such bottle on which lie the portions of that bottle engaged by the disc-like elements. Therefore, each such bottle will tend to pivot about the lateral axis 312 of that bottle when it is engaged by the run 154.

As in the embodiments described above, those bottles which are in first end trailing dispositions at the inception of such engagement will be pivoted about their lateral axes in the clockwise direction, towards first end leading dispositions. The run 154 remains engaged with each such bottle for a long enough time to cause each such bottle to pivot all the way to a first-end leading disposition. Any bottle which is initially in a first end leading disposition, such as the bottle 300b illustrated in broken lines in FIG. 5, will be prevented from pivoting about its lateral axis 312 to any substantial extent, because the run 154 will prevent any substantial radially outward movement of the trailing second end 306 of such a bottle. Thus, all of the bottles transported by the disc-like elements downstream of the booster means 26'' will be first-end leading disposition. Such bottles will be removed from between the disc-like elements by the takeoff cam 30.

In the embodiment shown in FIG. 5, the guide members of the guide means 20'' do not act as stop members. The guide members 34'' and 32'' terminate substantially upstream of the booster means 26''. The guide means 20'' advances each bottle to be processed in random first end leading or first end trailing disposition into the space 62 between the disc-like elements substantially upstream of the booster means 26''. The disc-like elements 52 and 54 carry the bottles in such random dispositions to the booster means.

An apparatus according to a fourth embodiment of the present invention is depicted in FIGS. 9 and 10. The transport means 22' of this embodiment includes a first endless belt 160 and a second endless belt 162. An upstream pulley 164 and a downstream pulley 166 are operatively associated with the first endless belt 160. Likewise, an upstream pulley 168 and a downstream pulley 170 are operatively associated with the second endless belt 162. The upstream pulleys 164 and 168 are rotatably mounted to a base plate 172 by means of shafts 174 and 176. The downstream pulleys 166 and 170 are fixedly mounted to shafts 178 and 180 respectively. The shafts 178 and 180 are rotatably mounted to a box 182 which in turn is fixedly mounted to the base plate 172. The box and the base plate are so arranged that all of the shafts 174, 176, 178 and 180 extend parallel to one another and the distance between the shafts 174 and 176 is equal to the distance between the shafts 178 and 180. All of the pulleys 164, 166, 168 and 170 are of equal diameter and lie in the same plane. Therefore, the pulleys will support the belts 160 and 162 so that a first run 184 of the first belt 160 confronts a first run 186 of the second belt 162. The outer surface of each of these endless belts (the surface which does not contact the pulleys associated with such belt) is covered with a resilient material.

A drive mechanism (not shown) is mounted within the box 182. This drive mechanism is arranged to rotate the pulley 166 in a counterclockwise direction as seen in FIG. 9 at a predetermined rotational speed and to rotate the pulley 170 in a clockwise direction at an equal predetermined rotational speed. Such rotation of the pulleys 166 and 170 will drive the endless belts 160 and 162 so that their confronting runs 184 and 186 move in the downstream direction (to the right in FIG. 9) at the same speed.

The guide means 20''' of the apparatus includes a pair of guide members 188 and 190, which are fixedly mounted to the base plate 172 by means of a support bracket 191. The guide members 188 and 190 define an elongated channel 192. A pair of side rails 194 are mounted to the upper guide member 188 and further define the channel 192 along its sides. As in the embodiments described above, the upstream end of the channel is connected to the outlet of a bottle supply means (not shown), which supplies a stream of bottles in random, first end leading and first end trailing dispositions. Preferably, the guide means 20''' includes a pair of timing rollers (not shown) similar to the timing rollers 44 and 46 depicted in FIG. 1. These timing rollers will control the rate of advance of bottles along the channel 192. The guide members 188 and 190 are arranged so that they will constrain each bottle 300 which advances along the channel 192 in a disposition wherein its lengthwise axis extends substantially parallel to the direction of elongation of the channel and its shortest lateral axis 132 extends laterally of the channel and perpendicularly to the surfaces of the confronting belt runs 184 and 186. The guide members extend between the upstream pulleys 164 and 168, so that bottles advancing along the channel 192 will be advanced into the space 196 between the confronting runs 184 and 186.

The width of the space 196 between the confronting runs 184 and 186 is slightly less than the length of the lateral axis 312 of each bottle. Therefore, as each bottle 300 is advanced into the space 196 it will be engaged at two portions 198 and 200 (FIG. 9) by the surfaces of the confronting runs 184 and 186. The engaged portions of each such bottle will lie on lateral axis 312 of that bottle. As each bottle is so engaged, it is transported downstream by the confronting runs 184 and 186. Preferably, the speed of the confronting runs 184 and 186 is so selected that it will be greater than the rate of advance of the bottles 300 along the channel 192. Therefore, as each bottle becomes engaged between the confronting runs of the belts, it is accelerated away from the next succeeding bottle so that the bottles become spaced from one another as they enter the space 196 between the confronting runs.

The booster means 26''' of the embodiment depicted in FIGS. 9 and 10 includes a third endless belt 202 which is operatively associated with an upstream pulley 204 and a downstream pulley 206. The upstream pulley 204 is rotatably mounted on a shaft 208 which is fixedly mounted to a frame member 210 (FIG. 9) which extends upwardly from the base plate 172 (towards the viewer in FIG. 9). The downstream pulley 206 is fixedly mounted to a shaft 214 which is driven by a motor 216 (FIG. 9). The motor 216 is mounted to the frame member 210. The outer surface of the third belt 202 (the surface which does not contact the pulleys 204 and 206) is coated with a resilient material. The shafts and pulleys associated with the endless belt 202 are constructed and arranged to support it so that its first run 218 confronts the space 196 between the runs 184 and 186 of the other endless belts. The motor is arranged to drive the pulley 206 in a counterclockwise direction, as shown in FIG. 10, which in turn will cause the first run 218 to move in the downstream direction (to the right in FIG. 10). The speed of operation of the motor 216 is selected so that the confronting run 218 of the belt 202 moves at a greater speed than the runs 184 and 186.

As shown in FIG. 10, each bottle which is transported by the transport means will be engaged by the first run 218 of belt 202 during such transportation. The run 218 will engage each such bottle 300 at a point 220 remote from the lateral axis 312 connecting its points of engagement 198 and 200 (FIG. 9) with the runs 184 and 186. Because the run 218 is moving faster than the runs 184 and 186, the point 220 of each bottle which is so engaged by the run 218 will advance in the downstream direction at a greater rate than the points 198 and 200 on the axis 312 of that bottle. Therefore, each such bottle will tend to pivots in a clockwise direction as seen in FIG. 10, about its lateral axis 312. Any such bottle which is advanced by the guide means 20''' in a first end trailing disposition (such as the bottle 300a in FIG. 10) will pivot about its axis 312 towards a first end leading disposition. As each such bottle begins to pivot, a new point 222 on its surface becomes engaged with the run 218. This pivoting motion continues until the bottle has completely pivoted into a first end leading disposition, indicated at 300c in FIG. 10. Depending on the shape of the bottles being processed, the first end of each bottle may move slightly upwardly, as seen in FIG. 10, as that bottle pivots about its lateral axis 312. The resilient surface of the belt 202 allows such slight upward motions.

Once a bottle attains a first end leading disposition, it will not pivot any further about its lateral axis 312. The run 218 of the third endless belt 202 will interfere with the trailing second end 304 of the bottle and will prevent it from moving upwardly as shown in FIG. 10 to any substantial extent. Therefore, the bottle will be unable to pivot in the clockwise direction beyond a substantially first end leading disposition. Of course, any bottle which is advanced by the guide means 20''' in a first end leading disposition, and which is therefore in a first end leading disposition at the inception of its engagement by the run 218, will also be prevented from pivoting by interference of its second end with the belt run 218. Thus, any such bottle will remain in such first end leading disposition.

The bottles transported downstream from the booster means 26''' by the transport means will be in substantially uniform, first end leading dispositions. The bottles so transported will be released from their engagement with the confronting runs 184 and 186 as they pass the downstream pulleys 166 and 170 (FIG. 9). An exit chute 224 is provided for accepting such bottles and guiding them towards further processing equipment (not shown). The upstream end of this chute 224 is provided with a pair of lead in guide members 226 and 228 which help to guide any bottles which may have accidentally become vertically displaced into the chute.

As will be appreciated, various combinations and alterations of the features described in the foregoing description of the preferred embodiments can be utilized without departing from the scope of the present invention as set forth in the appended claims. Merely by way of example, an apparatus using a linear belt transport means, such as that depicted in FIGS. 9 and 10, could utilize a roller booster means akin to that depicted in FIGS. 1 through 3. In such an embodiment, a portion of the peripheral surface of the roller would be arranged to confront the space between the confronting belt runs of the transport means, and drive means associated with the roller would be arranged to rotate the roller so that such confronting portion moved in the downstream direction at a higher linear speed than the confronting belt runs of the transport means.

Any suitable form of drive means can be utilized in any of the embodiments described above so long as the drive means utilized is capable of moving the elements to be driven at the desired speeds and in the desired directions. For example, each mobile element of the apparatus could be separately linked to a separate electric or hydraulic motor, and each of such motors could be provided with appropriate speed control devices. If a drive belt such as that illustrated in FIGS. 1 through 3 is utilized to drive the transport means and booster means, the timing rollers associated with the guide means may also be driven by that belt.

In a variation (not shown) of the embodiment depicted in FIG. 4, the arm and roller of the booster means may project from a pivot point beneath the guide means to a position between the disc-like elements of the transport means. In this variation, the roller of the booster means is positioned adjacent to the axis of rotation of the disc-like elements, between the end of the guide means 20' and such axis, so that bottles transported by the disc-like elements pass radially outwardly of the roller. The drive means associated with the roller and the transport elements is arranged to rotate the roller in the same direction as the disc-like elements, but at a greater rotational speed. As can be appreciated, in such a variation, bottles which are in first-end trailing disposition will be pivoted towards a first-end leading disposition by way of intermediate disposition in which the second end of each bottle extends radially outwardly with respect to the disc-like elements. The stop means of this variation are positioned radially inwardly of the path of the bottles.

It will be understood that the foregoing description of the preferred embodiments of the present invention is for purposes of illustration only, and that the various structural and operational features and relationships herein disclosed are susceptible to a number of modifications and changes, none of which entails any departure from the spirit and scope of the present invention as defined in the hereto appended claims.

What is claimed is:

1. Bottle orienting apparatus comprising:
   (a) guide means for receiving and sequentially advancing in random first-end leading and first-end trailing dispositions a series of bottles, each of which has a first end, a second end of different configuration than its first end, a lengthwise axis extending between its ends, and a lateral axis adjacent to its first end;
   (b) transport means for sequentially receiving each bottle advanced by said guide means, pivotably engaging a pair of portions of each such bottle when portions lie on the lateral axis of such bottle, and transporting each such bottle, while such portions are so engaged, away from said guide means so that the engaged portions of each such bottle move with substantially equal, predetermined velocities generally perpendicular to the lateral axis of such bottle;
   (c) booster means for sequentially frictionally engaging a third portion of each such bottle remote from the lateral axis of such bottle and, during the transportation of such bottle by said transport means, urging such third portion to move with a velocity of the same direction but of greater magnitude than said predetermined velocities, whereby each such bottle will tend to pivot about the lateral axis thereof;
   (d) stop means for preventing the pivoting, about the lateral axis thereof, during its engagement by said booster means, of any bottle which is in first-end leading disposition at the beginning of such engagement but permitting such pivoting of any bottle which is in first-end trailing disposition at the beginning of such engagement, whereby any bottle which is advanced by said guide means in first-end leading disposition will retain such disposition during its transportation by said transport means, but any bottle which is advanced by said guide means in first-end trailing disposition will be pivoted toward a first-end leading disposition during such transportation; and
   (e) takeoff means for sequentially removing from said transport means each bottle transported thereby, the guide means, transport means and takeoff means being so constructed and arranged that the sequential order of the bottles in said series of bottles remains unchanged during the passage of the bottles therethrough.

2. Apparatus as claimed in claim 1, wherein said transport means includes a pair of mobile transport elements having opposed generally parallel surfaces defining a space therebetween which is narrower than the length of the lateral axis of each bottle to be processed, said guide means include means for advancing each bottle to be processed into said space so that the lateral axis of such bottle extends generally perpendicularly of said surfaces, whereby one of said pair of portions of such bottle will be frictionally engaged with a portion of one of said surfaces, the other one of said pair of portions of such bottle will be frictionally engaged with a portion of the other one of said surfaces, said transport means also includes means for moving said transport elements so that the bottle-engaging portions of said surfaces move with identical predetermined velocities, and said booster means includes a mobile bottle-engaging element having a surface confronting said space so that a portion of such surface will engage said third portion of each bottle during the engagement thereof with said said transport elements, and means for moving said bottle-engaging element so that the surface portion of said bottle-engaging element engaging each bottle moves with a velocity of the same direction but of greater magnitude than the velocities of the bottle-engaging surface portions of said transport elements.

3. Apparatus as claimed in claim 2, wherein said mobile transport elements are disc-like elements, said disc-like elements are arranged coaxially with one another so that radially extensive surfaces of said disc-like elements constitute said opposed surfaces thereof, said means for moving said transport elements includes means for rotating said disc-like elements about their common axis at the same speed and in the same direction, said mobile bottle-engaging element is a roller, the axis of said roller is substantially parallel with the axis of said disc-like elements, the periphery of said roller confronts the space between the radially extensive surfaces of said disc-like elements, and said means for moving said bottle-engaging element includes means for rotating said roller.

4. Apparatus as claimed in claim 3, wherein the axis of said roller lies radially outwardly of said disc-like elements and said means for rotating said roller is constructed and arranged to rotate said roller in a direction opposite to the direction of rotation of said disc-like elements, whereby any bottle which is advanced by said guide means in first end trailing disposition will be pivoted, during its engagement with said roller, towards a first-end leading disposition by way of an intermediate disposition in which its second end faces towards the axis of said disc-like elements and its first end faces away from such axis.

5. Apparatus as claimed in claim 4, further comprising a frame, wherein said roller and said disc-like elements are rotatably mounted to said frame so that the axis of said roller is maintained at a fixed location with respect to the axis of said disc-like elements, and the peripheral surface of said roller is resilient, whereby said roller will interfere with the second end of any bottle which is in first-end leading disposition at the inception of its engagement by said roller and prevent any such bottle from so pivoting about the lateral axis thereof, but said roller will allow any bottle which is in second-end leading disposition at the inception of such engagement to so pivot, so that said roller will act as part of said stop means.

6. Apparatus as claimed in claim 4, further comprising a stationary member extending between said disc-like elements downstream of said roller, said stationary member being constructed and arranged to engage the second end of any bottle which is transported by said disc-like elements in said intermediate disposition whereby any such bottle will be pivoted from said intermediate disposition towards a first-end leading disposition.

7. Apparatus as claimed in claim 6, wherein said stationary member has a surface which faces radially outwardly with respect to said disc-like elements, such surface has an upstream end and a downstream end, and such surface slopes radially outwardly with respect to said disc-like elements from said upstream end to said downstream end.

8. Apparatus as claimed in claim 7, wherein said takeoff means includes a stationary takeoff cam and said takeoff cam has a bottle-engaging surface extending from the downstream end of said surface of said stationary member to a point outside of the periphery of said disc-like elements.

9. Apparatus as claimed in claim 4, wherein said stop means includes a stop member positioned immediately upstream of said roller at a fixed position relative to the axis of said disc-like elements radially outwardly of the path of the bottles, whereby said stop member will interfere with the trailing portions of any bottle which is in first-end leading disposition at the inception of its engagement by said roller and prevent any such bottle from pivoting about its lateral axis during at least a part of such engagement.

10. Apparatus as claimed in claim 9, wherein said guide means includes a pair of opposed elongated guide members defining a channel therebetween and extending generally tangentially of said disc-like elements, one of said guide members extends between such elements, the other one of said guide members is further from the axis of said disc-like elements and terminates upstream of said roller, the greatest lateral dimension of said channel is less than the length of each bottle to be processed, and said guide means also includes means for advancing each such bottle along said channel so that the lengthwise axis of such bottle extends generally parallel to the direction of elongation of such channel.

11. Apparatus as claimed in claim 10, wherein said other one of said guide members constitutes said stop member.

12. Apparatus as claimed in claim 2, wherein said mobile transport elements are first and second endless belts, said transport means also includes a pair of pulleys operatively associated with each one of said endless belts, said pulleys being constructed and arranged to support said endless belts so that one run of said first endless belt extends parallel to and confronts a run of said second endless belt, and said means for moving said transport elements includes means for driving said endless belts so that their confronting runs move in the downstream direction at the same speed.

13. Apparatus as claimed in claim 12, wherein said mobile bottle-engaging element of said booster means is a third endless belt, said booster means also includes a pair of pulleys constructed and arranged to support said third endless belt so that a first run of said third endless belt confronts the space between the confronting runs of said first and second endless belts, said means for moving said bottle-engaging element includes means for driving said third endless belt so that the first run of said third endless belt moves in the downstream direction at a speed greater than the speed of said first and second endless belts, and said guide means includes means for advancing each bottle to be processed into the space between the confronting runs of said first and second endless belts so that the lengthwise axis of such bottle extends generally in the upstream to downstream direction.

14. Apparatus as claimed in claim 13, wherein said pulleys are constructed and arranged to maintain said first run of said third endless belt at a fixed location in the direction lateral to said first and second endless belts, whereby said first run of said third endless belt will interfere with the trailing portions of any such bottle which is in first-end leading disposition at the inception of such engagement and prevent such bottles from so pivoting, so that said first run of said third endless belt will act as part of said stop means.

15. Apparatus as claimed in claim 2, wherein said guide means includes means for advancing each bottle into said space between said transport elements at a predetermined rate of advance and said means for moving said transport elements is constructed and arranged to move the bottle-engaging portions of said transport elements at a speed greater than said predetermined rate of advance.

* * * * *